United States Patent [19]
Eguchi

[11] Patent Number: 5,221,524
[45] Date of Patent: Jun. 22, 1993

[54] APPARATUS FOR PRODUCING HYDROGEN

[75] Inventor: Tomoki Eguchi, Tokyo, Japan

[73] Assignee: Kabushiki Kaisha Toshiba, Kawasaki, Japan

[21] Appl. No.: 750,604

[22] Filed: Aug. 27, 1991

[30] Foreign Application Priority Data

Aug. 27, 1990 [JP] Japan .................. 2-222371

[51] Int. Cl.$^5$ .............. B01J 8/04; C01B 3/02; C01B 3/12
[52] U.S. Cl. .............. 422/189; 423/648.1; 423/655
[58] Field of Search ............ 423/656, 648.1, 655; 422/189

[56] References Cited

U.S. PATENT DOCUMENTS

| | | | |
|---|---|---|---|
| 4,091,086 | 5/1978 | Hindin et al. | 423/656 |
| 4,789,540 | 12/1988 | Jenkins | 473/648.1 |
| 4,869,889 | 9/1989 | Sherwin et al. | 423/376 |
| 5,030,440 | 7/1991 | Lywood et al. | 423/655 |

OTHER PUBLICATIONS

John H. Perry, *Chemical Engineers' Handbook*, Fourth Edition, McGraw-Hill Book Co. (1963), pp. 5-45, 5-46, 5-47.
Suzuki, A., *Sekiyu Gakkaishi*, 15, (1), 21(1972).
Inugai, T., *Kagaku Koujou*, 13, (2), 72(1970).

Primary Examiner—Wayne Langel
Attorney, Agent, or Firm—Oblon, Spivak, McClelland, Maier, & Neustadt

[57] ABSTRACT

A process for producing hydrogen newly adds steps of introducing any of methanol and mixed fluid of methanol and water into said reactor, and converting most of said methanol into hydrogen, carbon dioxide and a small amount of carbon monoxide in the case of converting carbon monoxide in mixture gas containing hydrogen, carbon monoxide, carbon dioxide methane, and steam obtained by steam reforming reaction of hydrocarbon or its oxide into hydrogen by steam shift conversion reaction by using a reactor having a catalyst containing copper.

6 Claims, 5 Drawing Sheets

| NUMERAL | 25 | 26 |
|---|---|---|
| TEMPERATURE [°C] | 25 | 205 |
| PRESSURE [ata] | 8.0 | 8.0 |
| FLOW RATE [kg-mol/h] | | |
| $H_2$ | | 0.567 |
| $CO_2$ | | 0.151 |
| CO | | 0.002 |
| $CH_4$ | | 0.021 |
| $H_2O$ | | 0.326 |
| $CH_3OH$ | 0.0224 | TRACE |

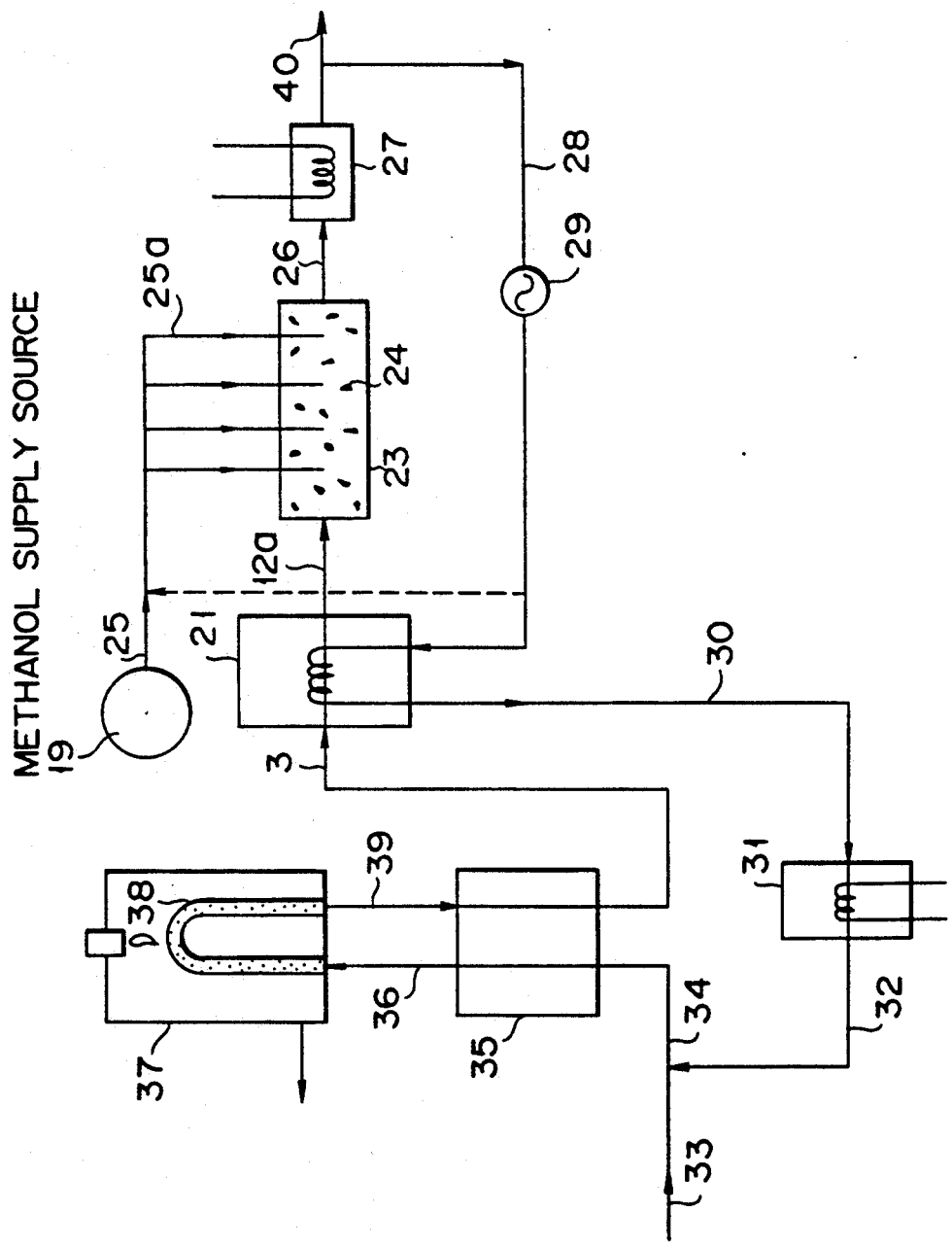
F I G. 2A

| NUMERAL | 33 | 36 | 39 | 40 | 28 | 34 | 30 | 32 |
|---|---|---|---|---|---|---|---|---|
| TEMPERATURE °C | 194 | 480 | 589 | 50 | 50 | 194 | 172 | 194 |
| PRESSURE [ata] | 8.4 | 8.4 | 8.1 | 8.0 | 8.6 | 8.4 | 8.5 | 8.4 |
| FLOW RATE [kg-mol/h] $H_2$ | | | 0.437 | 0.567 | | | | |
| $CO_2$ | | | 0.066 | 0.151 | | | | |
| $CO$ | | | 0.065 | 0.002 | | | | |
| $CH_4$ | 0.1171 | 0.1171 | 0.021 | 0.021 | | 0.1171 | | |
| $H_2O$ | 0.2982 | 0.6122 | 0.411 | 0.0119 | 0.3137 | 0.6122 | V0.065 L0.249 | V0.314 |
| $C_2H_6$ | 0.0078 | 0.0078 | | | | 0.0078 | | |
| $C_3H_8$ | 0.0042 | 0.0042 | | | | 0.0042 | | |
| $N-C_4$ | 0.0018 | 0.0018 | | | | 0.0018 | | |
| $N-C_5$ | 0.00009 | 0.00009 | | | | 0.00009 | | |

FIG. 2B

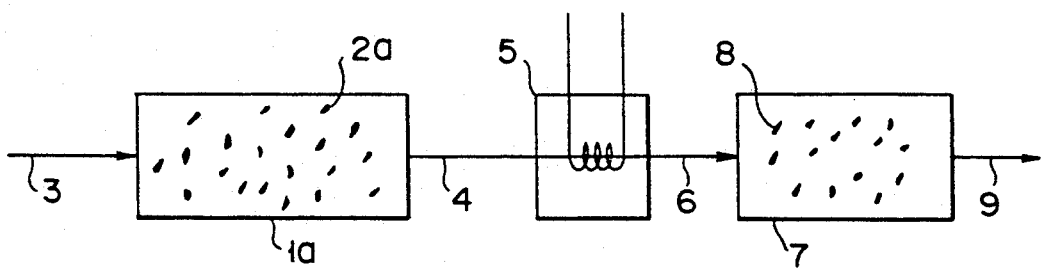
F I G. 3A    (PRIOR ART)
| NUMERAL | 3 | 4 | 9 | 6 |
|---|---|---|---|---|
| TEMPERATURE [°C] | 390 | 433 | 225 | 205 |
| PRESSURE [ata] | 8.1 | 8.0 | 8.0 | 8.0 |
| FLOW RATE [kg-mol/h] | | | | |
| $H_2$ | 0.437 | 0.480 | 0.500 | 0.480 |
| $CO_2$ | 0.066 | 0.109 | 0.129 | 0.109 |
| CO | 0.065 | 0.022 | 0.002 | 0.022 |
| $CH_4$ | 0.021 | 0.021 | 0.021 | 0.021 |
| $H_2O$ | 0.411 | 0.368 | 0.348 | 0.368 |
F I G. 3B    (PRIOR ART)

| NUMERAL | 12a |
|---|---|
| TEMPERATURE [°C] | 205 |
| PRESSURE [ata] | 8.0 ata |
| FLOW RATE [kg-mol/h] | |
| $H_2$ | 0.437 |
| $CO_2$ | 0.066 |
| CO | 0.065 |
| $CH_4$ | 0.021 |
| $H_2O$ | 0.411 |

APPARATUS FOR PRODUCING HYDROGEN

BACKGROUND OF THE INVENTION

1. Field of the Invention

The present invention relates to a process for producing hydrogen to efficiently produce hydrogen to be used for various industries such as petrochemical, fertilizer, iron manufacturing industries, etc., and an apparatus therefor.

2. Description of the Related Art

Hydrogen is widely used in main industries such as petrochemical, fertilizer, iron manufacturing industries, etc. Recently, hydrogen is practically used as clean energy for fuel of automobiles, fuel cells, etc.

However, there have been various processes developed for producing hydrogen. Among them, a first process for producing hydrogen by steam reforming hydrocarbon is mainly employed at present.

According to the first process, natural gas is mixed with steam, and the mixture is contacted with Ni catalyst at high temperature to obtain mixture gas of hydrogen, carbon monoxide, carbon dioxide, methane and steam when the first process is normally used in industries. Carbon monoxide is considerably contained in the mixed gas containing hydrogen obtained by the first process.

Since the carbon monoxide in the mixed gas can be, however, converted to hydrogen by means of shift conversion reaction, a process for converting the mixed gas into hydrogen by reactions of two stages of high and low temperature shift conversions is generally employed in the industries.

FIG. 3A shows a configuration of a system for carrying out the first process for producing hydrogen. In FIG. 3A, a high temperature shift converter or reactor 1a contains a high temperature shift conversion catalyst 2a therein so as to carry out a high temperature shift conversion reaction, and is thermally insulated from the exterior. Reforming gas 3 obtained by steam reforming hydrocarbon is introduced into the reactor 1a. The reforming gas 3 containing carbon monoxide is fed to a cooler 5 as the gas 4 after a part of carbon monoxide in the reforming gas 3 is converted into hydrogen and carbon dioxide in the high temperature shift converter or reactor 1a. The gas 4 is cooled by the cooler 5. The cooled gas 6 is introduced into a low temperature shift converter or reactor 7. A low temperature shift conversion catalyst 8 is contained in the low temperature shift converter or reactor 7. Thus, the cooled gas 6 introduced from the cooler 5 is contacted with the low temperature shift conversion catalyst 8 and approx. 90% of the carbon monoxide in the cooling gas 6 is converted into hydrogen and carbon dioxide to obtain the gas 9 in the low temperature shift converter 7.

Unreacted carbon monoxide remains in the gas 9 containing hydrogen. Since the carbon monoxide acts detrimentally in some application of the hydrogen, the carbon monoxide content must be practically lowered to concentration of a low level which does not affect a detrimental action. Therefore, a highly active catalyst is employed under the conditions of 200° to 250° C. in the commercial low temperature shift converters.

FIG. 3B shows the amounts of gases to be produced in various sections of the system in experiments in FIG. 3A. In FIG. 3B, numerals 3, 4, 9 and 6 in upper columns respectively correspond to the gases produced in the sections in FIG. 3A.

In order to lower the concentration of the carbon monoxide in the reforming gas from 6.5 to 0.2%, the following reactions are required. The carbon monoxide in the reforming gas is first lowered from 6.5 to 2.2% in the high temperature shift converter or reactor 1a the temperature raised by the reaction heat in this case is then lowered to 205° C., and 90% of the content of the residual carbon monoxide in the reforming gas must be further converted in the low temperature shift converter or reactor 7. Hereafter the term reactor in shift converter or reactor is omitted for abbreviation. And the term reactor is also used for converter.

The reason why the concentration of the carbon monoxide in the reforming gas is reduced by the two stages of the shift converters 1a and 7 as described above is because the temperature of the outlet of the reactor is raised due to the heat generated according to the conversion reaction if it is carried out in one stage of a shift converter and the concentration of the carbon monoxide cannot be lowered to a low level at this temperature level due to chemical equilibrium.

However, in order to convert the carbon monoxide in the reforming gas by the two stages of high and low temperature shift converters, shift converters must be designed to fill a high temperature shift conversion catalyst 2a in the high temperature shift converters 1a of the former stage and to decrease the outlet temperature of the shift converter within the range of the heat resistant temperature of the catalyst. Further, the shift converters must also be designed to decrease the outlet temperature of the low temperature shift converter 7 of the latter stage within the heat resistant temperature of the low temperature shift conversion catalyst 8 filled in the shift converter 7.

Therefore, it is necessary to cool the heat generated in the shift conversion reaction so as to carry out the shift conversion reactions of the two stages by one stage.

FIG. 4A shows a configuration of a system for converting to hydrogen by shift conversion reaction of one stage. In FIG. 4A, reforming gas 3 reformed from hydrocarbon by steam is introduced to a cooler 11. The temperature of reforming gas 3 is lowered to 205° C. by the cooler 11 to obtain the reforming gas 12a, and the reforming gas 12a is then introduced into a low temperature shift converter 13. The low temperature shift converter 13 contains a catalyst 14 for producing hydrogen from the gas 12a by shift conversion. The shift converter 13 has a cooler 15 for removing the reaction heat generated during the shift conversion reaction. The gas 9 is produced from the cooled gas 12a which contains carbon monoxide by converting most of the carbon monoxide into hydrogen and carbon dioxide by shift conversion reaction in the low temperature shift converter 13.

FIG. 4B shows the measured result of the quantity of gas cooled to 205° C. by the cooler 11 in the configuration of the system.

However, since the cooler 15 for removing reaction heat is provided in the low temperature shift converter 13 of the system for converting at the one stage, its facility is complicated, its facility cost becomes expensive and is disadvantageous in its economy.

In the conventional system for converting to hydrogen by the shift conversion reactions of two stages, the shift converter outlet temperature of the former stage in which high temperature shift conversion catalyst is filled must be designed to fall within the range of the heat resistant temperature of the catalyst, and the outlet temperature of the low temperature shift converter of the rear stage in which the low temperature shift conversion catalyst is filled must be designed to fall within the range of the heat resistant temperature of the catalyst.

In the conventional system for converting carbon monoxide to hydrogen by shift conversion reaction of one stage, the cooler 15 is provided to remove reaction heat in the low temperature shift converter 13. Therefore, the facility itself is complicated, its facility cost becomes expensive, and is disadvantageous in economy.

Further, there is, in addition to the above-described method, a conventional process for introducing water directly into the shift converter to suppress the temperature increase of the reaction gas by vaporization and to provide an effect of accelerating the shift conversion reaction. However, according to this method, its system is complicated, the introduced water must be eventually recovered, and negative points of view exist in thermal energy.

SUMMARY OF THE INVENTION

Accordingly, it is a primary object of the present invention to provide a method and an apparatus for producing hydrogen capable of performing a shift conversion reaction only by one stage to increase production of hydrogen and to effectively use energy.

According to the present invention, there is provided a process for producing hydrogen for converting carbon monoxide in mixed gas containing at least carbon monoxide into hydrogen by steam shift conversion reaction by using a reactor having a catalyst comprising the steps of introducing any of alcohol or mixed fluid of alcohol and water into said reactor, and converting said alcohol into hydrogen, carbon dioxide and carbon monoxide.

In the process for producing hydrogen of the present invention, the mixed gas containing at least carbon monoxide is introduced directly into the low temperature shift converter without installing a high temperature shift converter, and alcohol or mixed fluid of alcohol and water is introduced into the portion of the low temperature shift converter where the carbon monoxide is converted into hydrogen and carbon dioxide to provide the following operation and effect. Most of the reaction heat generated when the carbon monoxide is reacted with the steam for conversion into hydrogen can be used as an endothermic source necessary in the case of converting the alcohol into hydrogen and carbon dioxide. Therefore, the steam reforming reaction of the alcohol can be accelerated. In other words, the generated heat in the case of converting the carbon monoxide is used for the absorption of heat of the decomposition reaction of the alcohol.

In this case, if the alcohol or mixture of alcohol and water to be introduced is liquid, it is once evaporated in gaseous state and then converted and therefore the heat necessary for the evaporation is supplied by the reaction heat by the shift conversion reaction of the carbon monoxide already existing. A catalyst to be used for the low temperature shift conversion must also have the activity in the following chemical reaction:

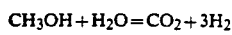

if methanol is used as alcohol. In this case, a catalyst containing copper is effective.

BRIEF DESCRIPTION OF THE DRAWINGS

The objects and advantages will be apparent from the following description taken in conjunction with the accompanying drawings in which:

FIG. 2A is a view of a configuration of a system of a second embodiment of a process and an apparatus for producing hydrogen in accordance with the present invention;

FIG. 2B is a view for explaining an experimental result in the system of FIG. 2A;

FIG. 3A is a view of a configuration of a system of an example of a process for producing hydrogen according to a conventional two-stage shift conversion system;

FIG. 3B is a view for explaining an experimental result in the system of FIG. 3A;

DETAILED DESCRIPTION OF THE PREFERRED EMBODIMENTS

An embodiment of the present invention will now be described with reference to the accompanying drawings.

Figures 1A, 1B:
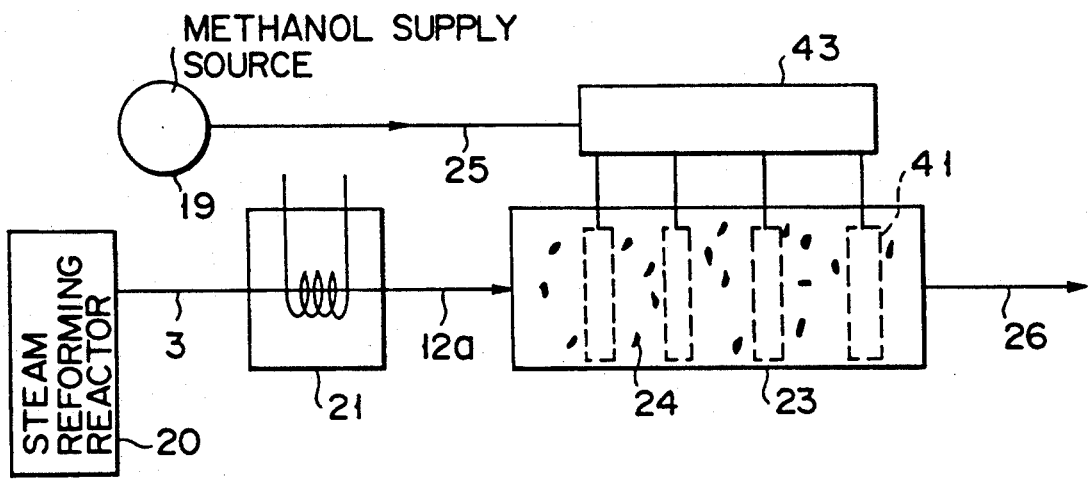
FIG. 1A is a view of a configuration of a system of a first embodiment of a process and an apparatus for producing hydrogen according to a process and an apparatus for producing hydrogen in accordance with the present invention.
FIG. 1B is a view for explaining an experimental result in the system of FIG. 1A.
Figures 4A, 4B:
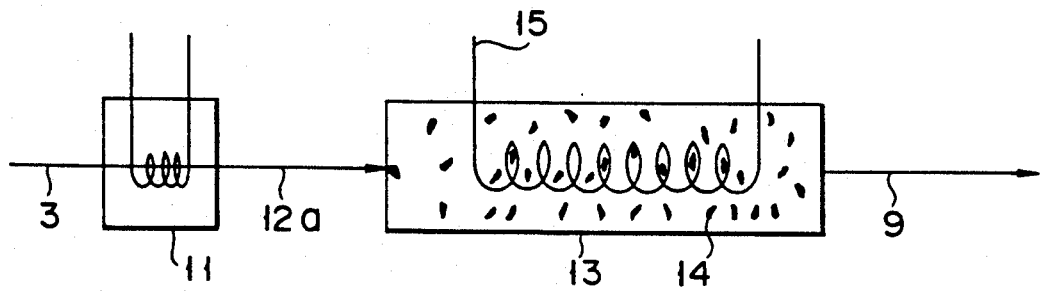
FIG. 4A is a view of a configuration of a system of an example of a process for producing hydrogen according to a conventional one-stage shift conversion system.
FIG. 4B is a view for explaining an experimental result of the system of FIG. 4A.

FIG. 1A shows a configuration of a system of a first embodiment for explaining a process for producing hydrogen according to the present invention. In FIG. 1A, reforming gas 3 obtained by reforming hydrocarbon with steam by a steam reforming reactor 20 is introduced into a cooler 21. Reforming gas 12a once cooled to 205° C. by the cooler 21 is introduced into a low temperature shift converter 23. In the low temperature shift converter 23, a catalyst 24 containing copper for producing hydrogen by shift conversion reaction is provided. In the low temperature shift converter 23, a methanol supply tube 25 is arranged to dispersively supply liquid methanol from a methanol supply source 19.

In the configuration of the system as described above, the reforming gas 12a cooled by the cooler 21 is introduced into the low temperature shift converter 23, and reaction heat is generated when the carbon monoxide in the gas is converted into hydrogen and carbon dioxide. Therefore, the reaction heat is effectively used for the decomposition reaction of the methanol dispersively supplied as described above, thereby maintaining the temperature in the reactor substantially uniform.

In the configuration of the system as described above, the reforming gas 3 at 390° C. from the steam reforming reactor 20 is once cooled to 205° C. by the cooler 21 and the cooled gas 12a from the cooler 21 is introduced into the low temperature shift converter 23. Then, carbon monoxide in the cooled gas 12a is converted to hydrogen by a catalyst 24 effective for the shift conversion reaction of the carbon monoxide and the decomposition of the methanol, and predetermined methanol (0.0224 kg-mol/hr in this embodiment) is simultaneously introduced into a plurality of positions in the shift converter 23. Thereafter, the reaction heat generated by the shift conversion reaction in the shift converter 23 is used for the absorption of heat of the steam decomposition reaction of the methanol to accelerate the shift conversion reaction, and gas 26 is thus output from the low temperature shift converter 23. In this case, the gas 26 obtains additional a amount of hydrogen corresponding to the decomposition amount of the methanol as compared with the conventional two-stage type reactor and can lower the concentration of the carbon monoxide to a predetermined value.

FIG. 1B shows the measured result of the shift conversion reaction in the configuration of the system of FIG. 1A. In FIG. 1B, numerals 25 and 26 in upper columns denote reference numerals 25 and 26 in FIG. 1A.

Comparison of the result of the conventional example of FIG. 3B with that of this embodiment of FIG. 1B will follow below.

As understood from FIG. 3B, the quantity of hydrogen in the gas 9 obtained from the conventional shift converter is 0.500 kg-mol/hr, while the quantity of hydrogen in the gas 26 in the embodiment of FIG. 1B is more than that, i.e., 0.567 kg-mol/hr. In other words, the shift conversion reaction must be carried out in the two stages in the conventional two-stage reactor, while the quantity of carbon monoxide can be lowered to a target value by the one-stage shift conversion reaction in the first embodiment of the present invention, and the quantity of hydrogen by the decomposition of the methanol can be further obtained as an increment.

According to this process, the inlet of the shift converter must be cooled to 205° C., which can be readily carried out by using an ordinary heat exchanger. The heat to be removed in this case can be effectively used as thermal energy source of generating steam, and producing hot water.

Then, a second embodiment of the present invention will now be described with reference to FIGS. 2A. In the second embodiment, the same components as those in FIG. 1A are denoted by the same reference numerals, and only different point will be mainly described. In FIG. 2A, gas 26 containing hydrogen from a low temperature shift converter 23 is cooled by a cooler 27. When the gas 26 is cooled by the cooler 27, most of the steam of the gas 26 is condensed. The condensate 28 is pressurized through a pump 29 and is introduced to a cooling tube in a cooler 21. The condensate 30 obtained from the cooler 21 is a gas-water mixture a part of which has been evaporated. This condensate 3 is introduced into heat exchanger 31. Then, the condensate 30 is evaporated by the heat exchanger 31 to become steam 32. The steam 32 from the heat exchanger 31 is mixed with mixed gas 33 of hydrocarbon and steam, and the resultant mixed gas 34 is supplied to a heat exchanger 35. The mixed gas 34 supplied to the heat exchanger 35 is heated to a higher temperature, and the heated gas 36 from the heat exchanger 35 is supplied to a reforming unit 37.

A reforming reaction tube 38 filled with a catalyst is arranged in the reforming unit 37. Steam reforming reaction occurs in the reforming reaction tube 38 in the state that the temperature in the tube 38 is high (700° to 800° C.), and the resultant reforming gas 39 is again heat exchanged by the heat exchanger 35, and the reforming gas 3 obtained from the reforming unit 37 is introduced into the cooler 21.

On the other hand, the gas 26 containing hydrogen obtained from the low temperature shift converter 23 is cooled by the cooler 27, and gas 40 containing hydrogen obtained after most of the steam is condensed is used for a facility necessary for the hydrogen.

In the second embodiment as described above, the condensate containing a small amount of methanol, condensed from the gas 26 by the cooler 27 is used as the cooling medium of the cooler 21, the portion of the condensate is evaporated, further fully evaporated and heated by the heat exchanger 31 to completely gaseous dry-gas 32, and the resultant gas 32 is mixed with mixed gas 33 of hydrocarbon gas and steam, further heated to a predetermined temperature by the heat exchanger 35, supplied to the reforming unit 37, and reforming reaction is carried out at a high temperature in the reforming reaction tube 3 containing the catalyst.

The reforming gas 3 obtained as described above is cooled by the cooler 21 to a predetermined temperature, the carbon monoxide is converted into hydrogen and carbon dioxide directly in the low temperature shift converter 23 without a high temperature shift converter by using a catalyst containing, for example, copper as a low temperature shift conversion catalyst having activity both for the shift conversion reaction of the carbon monoxide and the steam reforming reaction of the methanol, and the methanol is steam-reformed by using the heat of the shift conversion reaction at the same time to accelerate the endothermic reaction for decomposing the methanol into hydrogen and carbon dioxide.

FIG. 2B shows the measured results of the sections of a condensate recycle system and reforming gas system of the configuration of the system of FIG. 2A. In FIG. 2B, numerals 33, 36, 39, 40, 28, 34, 30 and 32 in upper columns all denote corresponding gas and liquid in FIG. 2A. In FIG. 2B, V is vapor, and L is liquid.

As apparent from FIG. 2B, the quantity of hydrogen of this embodiment is increased to 0.567 kg-mol/hr, while the quantity of hydrogen of the conventional two-stage shift conversion system of FIG. 3B is 0.500 kg-mol/hr. Further, the condensate obtained from the result of cooling the gas 26 by the cooler 27 is recycled to the reforming unit, or mixed with the methanol to be supplied to the low temperature shift converter to decompose the unreacted methanol. As a result, the energy can be effectively used, and the condensate can be redused, thereby carrying out the process for and the apparatus for producing hydrogen in high efficiency without environmental pollution.

In the second embodiment described above, the condensate obtained by condensing the steam in the hydrogen gas by the cooler 27 is pressurized by the pump 29, and introduced into the cooler 21. However, the portion of the condensate may be introduced into a methanol supply tube 25 as shown by a broken line in FIG. 2A, mixed with the methanol, and used. More specifically, one mole of methanol is reacted with one mole of water to produce one mole of carbon dioxide and 3 moles of hydrogen in the steam reforming reaction of the methanol. As is apparent from a chemical thermodynamic point of view, the reaction is advanced as the partial pressure of the water is raised. As a result, unreacted methanol is reduced. When unreacted methanol contained in the condensate is recycled in this manner for use, since the substances are not discharged out of the system, no problem in contamination of quality of effluent occurs.

The present invention is not limited to the particular embodiment shown in the drawings and described above. Various modifications may be made without departing from the spirit or scope of the general inventive concept as defined by the appended claims and their equivalents. For example, the present invention may be carried out as below.

(1) In the above-described embodiments, the methanol or mixed fluid of the methanol and the water is supplied to the low temperature shift converter 23. However, ethanol or mixed fluid of ethanol and water may be supplied to the low temperature shift converter 23. In other words, the methanol supply source 19 in FIGS. 1A and 2A may be replaced with an ethanol supply source.

(2) As the mixture gas of the reforming gas 3, mixture gas containing carbon monoxide, hydrogen, carbon dioxide, methane and steam is employed. However, as the mixture gas, if it contains at least carbon monoxide, any mixture gas may be employed.

(3) As the reaction conditions of the low temperature shift converter 23, the following conditions including the above-described embodiments may be carried out. Any of the pressure ranged from 0.5 atm. to 40 atm. by absolute pressure, any of the temperature ranged from 150° C. to 400° C., and any of the concentration of carbon monoxide of the inlet ranged from 1% to 50% may be employed.

As the law of chemical equilibrium tells, the temperature of the gas 26 at the outlet of the shift converter 23 depends on the CO concentration of the gas 26.

(4) In the above-described embodiments, the methanol supply position to be divided into a plurality through which methanol is introduced into the low temperature shift converter 23 may be provided with means 43 for uniforming temperature distribution, in the shift converter 23 by altering the interval of the supply tube 25a by considering that the temperature distribution becomes uniform.

(5) In order to accelerate the reaction of the methanol, sprayers are attached to the end of the supply tube 25a to spray it in the form of fog, or methanol-supplying means 41 is provided in the shift converter 23, which supplies the methanol in uniform distribution in a section perpendicular to the flowing direction of the mixed gas.

(6) Any of the alcohol and mixed fluid of the alcohol and the water to be introduced into the shift converter 23 is divided and introduced, and the dividing position and the dividing amount satisfy the condition of the temperature of the shift converter ranges from 150° C. to 400° C.

(7) When any of the methanol and the mixed fluid of the methanol and the water is introduced into the shift converter 23, the quantity of unreacted alcohol after the steam shift conversion reaction is completed may be set to 1% or less of the quantity of the alcohol to be introduced into the shift converter 23 to be economic.

(8) The catalyst 24 used in the shift converter 23 is not limited to that containing the copper. Any catalyst can be used which helps to reform alcohol into hydrogen, carbon monoxide, and carbon dioxide, and to convert mixture of carbon monoxide and steam into hydrogen and carbon dioxide.

What is claimed is:

1. An apparatus for producing hydrogen, comprising:
   a mixed gas supply source for supplying a mixed gas containing at least a hydrocarbon and/or hydrocarbon oxide, and steam;
   a reforming unit for reforming a mixed gas from said mixed gas supply source introduced therein into a high temperature reformed gas constituted of at least hydrogen and carbon monoxide by the steam reforming reaction;
   a heat exchanger for heating the mixed gas being introduced into said reforming unit to a first predetermined temperature, and for cooling the high temperature reformed gas supplied from said reforming unit to a second predetermined temperature;
   a methanol supply source for supplying methanol to a shift reactor;
   a shift reactor containing a copper catalyst into which methanol and the high temperature reformed gas cooled by said heat exchanger can be introduced and in which most of the methanol, by a steam reforming reaction, and carbon monoxide, by the steam shift conversion reaction, in the high temperature reformed gas can be converted to hydrogen and carbon dioxide which further contains a small quantity of carbon monoxide;
   a first cooler provided between said reactor and said heat exchanger and having a cooling medium passage for cooling said high temperature reformed gas;
   a second cooler for cooling the gas formed in said reactor thereby obtaining a condensate; and
   a condensate pump for pressurizing said condensate and feeding the condensate back to the mixed gas heated by said heat exchanger through the cooling medium passage of said first color.

2. The apparatus of claim 1, wherein a part of the condensate pressurized by said condensate pump and supplied to the first cooler is mixed with methanol supplied from the methanol supply source.

3. The apparatus of claim 1, comprising a temperature distribution uniformity means for uniformalizing the temperature distribution in the catalyst layer of the reactor into which methanol is introduced.

4. The apparatus of claim 3, wherein said temperature distribution uniformity means comprises means for dividing methanol into a plurality of flowing streams to achieve introduction of methanol into said reactor.

5. The apparatus of claim 1, comprising homogeneous dispersion means for promoting the steam shift conversion reaction of methanol introduced into said reactor.

6. The apparatus of claim 5, wherein said homogeneous dispersion means comprises a means for supplying methanol from a methanol supply source, being dispersed as a spray, or for supplying the methanol in a dispersed state such that the methanol concentration is uniform across a cross-section perpendicular to the direction of flow of the mixed gas in said shift reactor.

* * * * *